No. 731,162. PATENTED JUNE 16, 1903.
C. W. CARTER.
SNAP HOOK.
APPLICATION FILED DEC. 31, 1902.
NO MODEL.
Fig. 1.
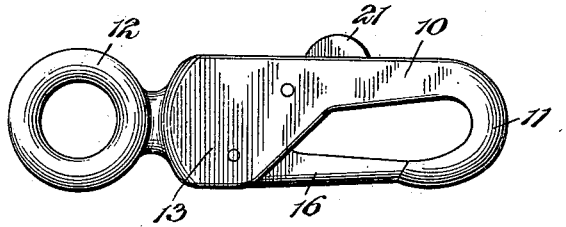
Fig. 2. Fig. 3.
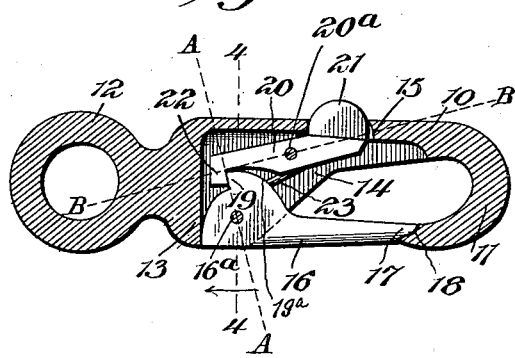 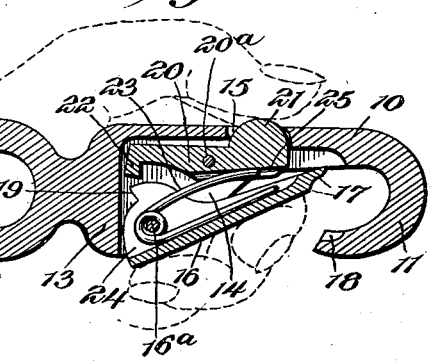
Fig. 5.
Fig. 4. 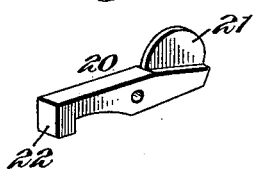 Fig. 6.
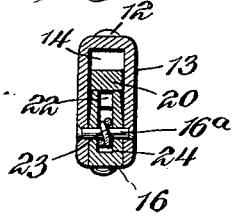 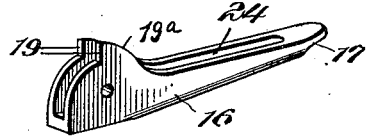
Charles W. Carter, Inventor,
Witnesses
Howard D. Orr
B. G. Foster
By
E. G. Siggers
Attorney
THE NORRIS PETERS CO., PHOTO-LITHO., WASHINGTON, D. C.

No. 731,162. Patented June 16, 1903.

UNITED STATES PATENT OFFICE.

CHARLES W. CARTER, OF ALEDO, ILLINOIS.

SNAP-HOOK.

SPECIFICATION forming part of Letters Patent No. 731,162, dated June 16, 1903.

Application filed December 31, 1902. Serial No. 137,362. (No model.)

*To all whom it may concern:*

Be it known that I, CHARLES W. CARTER, a citizen of the United States, residing at Aledo, in the county of Mercer and State of Illinois, have invented a new and useful Snap-Hook, of which the following is a specification.

This invention contemplates a snap-hook of such form and construction as will make it suitable for use on harness, tie ropes or straps, linemen's safety-belts, the rigging of sailing-boats, and wherever a secure snap-hook is wanted.

It also contemplates a snap-hook which in practical use is as simple in operation as the old and usual form of non-locking snap-hook, but which when once snapped in position on the ring, link, bail, or other fastening is automatically locked and cannot be released therefrom except by design and in a certain simple manner. Neither can the hook be opened by accident sufficiently to catch upon other parts of harness, wires, ropes, twigs, weeds, or other objects.

It still further contemplates a snap-hook which may be cheaply produced, is of few parts, not likely to get out of order, and is simple and absolutely sure in operation.

The improved self-locking snap-hook is shown in the accompanying drawings, wherein—

Figure 1 is a side elevation of one form of the same. Fig. 2 is a longitudinal sectional view with the tongue locked. Fig. 3 is another sectional view showing the tongue in inoperative position and indicating the manner of moving the same. Fig. 4 is a cross-sectional view through the snap-hook. Fig. 5 is a detail perspective view of the locking-dog, and Fig. 6 is a detail perspective view of the tongue.

Similar reference-numerals indicate corresponding parts in all the figures of the drawings.

The hook-body may be of any desired or well-known shape, comprising a shank 10, having a hook 11 at one end and an eye 12 at the other, said shank preferably having an enlarged portion 13. A longitudinally-disposed slot or chamber 14 is formed in the shank, and an opening 15 extends from the chamber through the rear wall thereof, as shown in Figs. 2 and 3. This opening may be of any length wished, and, in fact, the entire rear wall may be dispensed with, if desired. A tongue 16 is pivoted at one end in the chamber 14 contiguous to the eye and projects across the space between the shank and the free end of the hook, having a nib 17 on its projecting end that engages in a seat 18, formed in said hook. The pivoted end of the tongue is enlarged and provided with an inwardly-extending shoulder 19, that is located in the chamber 14 and on a line A A that intersects the pivot 16ª of the tongue, as shown in Fig. 2, the edge 19ª of the enlargement extending to the shoulder being concentric with the pivot 16ª. A locking-dog 20, arranged longitudinally within the chamber, is pivoted intermediate its ends, the end nearest the hook having a thumb-piece 21, that extends through the opening 15 and projects beyond the rear edge of the shank. The end of this dog which is nearest the eye 12 has an inwardly-extending lug 22, forming a shoulder that is located on the line A A and normally arranged in the path of movement of and in engagement with the shoulder 19 of the tongue, though movable out of said path when the thumb-piece is pressed inwardly. The line A A, in which the coacting shoulders are located, is disposed at right angles to a line B B drawn through the pivot 20ª of the dog and the base of the lug 22. This particular arrangement of the parts is important, as it insures complete and thorough locking action between the dog and the tongue, though permitting the ready release of the latter and the opening of the hook. The two members—namely, the tongue and dog—are held in operative relation by means of a spring 23 coiled about the pivot of the tongue, said tongue having a longitudinal chamfer 24, in which one arm of the spring is seated, the inner edge of the locking-dog having a longitudinal groove 25, which receives the other end of the spring. The shape of the spring, however, is of no particular importance and the form thereof may be modified as desired.

The operation of the self-locking snap-hook may be described as follows: If, for example, the form designed for tie-ropes is taken, such as is shown in the drawings, for which purpose it is especially suitable, it will naturally be grasped in the hand in such manner that that part of the back of the snap-hook nearly opposite the free end of the tongue 16 will rest upon the middle of the forefinger or will be pressed upon by the ball of the thumb, as indicated in Fig. 3. At this point is placed the externally-projecting part or finger-piece 21 of the locking device. While held in either of these ways the tongue is pressed against the bridle or other ring, as with the ordinary non-locking snap-hook. The first effect of this pressure is to lock the tongue more securely by forcing the inwardly-projecting shoulder 19 at the pivoted end of the tongue still more firmly against the lug 22 of the locking-dog. The opposing pressure upon the finger-piece 21 is of course substantially equal to that of the ring upon the tongue. As this pressure increases it is soon sufficient to overcome the force of the spring and the slight friction of the shoulder 19 against the lug 22. The finger-piece 21 is then forced inwardly, the lug 22 is raised, and at the same time has a slightly-rearward movement away from the shoulder 19 and out of its path of movement. The tongue being thereby released is forced inwardly, and the ring or other article can then be passed into the now open hook. Upon releasing the pressure the tongue 16 springs back to close the throat of the snap-hook by force of the spring 23, and the locking-dog is moved to operative position from the same cause, locking the tongue as soon as pressure is removed from the finger-piece 21. In actual use these successive movements appear to take place simultaneously and the mechanism responds instantly. It is opened for removal in a similar manner, the thumb or finger being used to force back the tongue, after which the ring is slipped out, as in the common snap-hook.

It will be observed that pressure upon the tongue alone will not open the snap-hook, nor will pressure upon the locking-lever alone open it, for the particular arrangement of the shoulders and pivots affords a secure lock. The hook can only be opened by simultaneous pressure upon both tongue and locking-lever, a condition which can hardly occur through mere accident. It will also be observed that this snap-hook may be operated entirely by one hand, is held in the same manner, operated by the same movements, and as simply and easily as the ordinary form of non-locking snap-hook.

From the foregoing it is thought that the construction, operation, and many advantages of the herein-described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a snap-hook, the combination with a shank having a hook at one end, of an inwardly-moving locking-tongue pivoted to the shank and having its free end arranged to engage the free end of the hook, a locking-dog also pivoted to the shank, and coacting shoulders arranged respectively upon the pivoted end of the tongue and one end of the dog, said shoulders being located on a line that intersects the axis of the tongue.

2. In a snap-hook, the combination with a shank having a hook at one end and a longitudinally-disposed slot or chamber, of an inwardly-moving locking-tongue pivoted in the chamber and having its free end arranged to engage the free end of the hook, said tongue being provided on its pivoted end with a shoulder that is located on a line intersecting the pivot-axis of the tongue, and a locking-dog also pivoted between its ends in the chamber and having an inwardly-extending lug on its inner end, one face of said lug coacting with the shoulder of the tongue and arranged on the same line therewith, said line being disposed at substantially right angles to a line drawn through the base of the lug and the pivot-axis of the dog.

3. In a snap-hook, the combination with a shank having a hook at one end and an eye at the other and provided with a longitudinally-disposed slot or chamber, of an inwardly-movable tongue pivoted in the chamber contiguous to the eye and projecting across the space between the shank and the free end of the hook, said tongue having a shoulder that extends inwardly from a point contiguous to the pivot, a locking-dog pivoted between its ends in the chamber and having a thumb-piece at the end nearest the hook, said thumb-piece projecting from the back of the shank, the end of the dog nearest the eye having an inwardly-extending lug that is normally located behind the shoulder of the tongue, said lug being arranged on the opposite side of the pivot to the thumb-piece, and a spring bearing against the tongue and dog to hold them in their projected positions.

In testimony that I claim the foregoing as my own I have hereto affixed my signature in the presence of two witnesses.

CHARLES W. CARTER.

Witnesses:
J. S. TURNER,
L. E. BUTLER.